(12) United States Patent
Ragland (10) Patent No.: US 10,246,184 B2
(45) Date of Patent: Apr. 2, 2019

(54) AIRCRAFT WITH INTERNALLY HOUSED PROPELLOR UNITS

(71) Applicant: Jon M. Ragland, Central City, PA (US)

(72) Inventor: Jon M. Ragland, Central City, PA (US)

( * ) Notice: Subject to any disclaimer, the term of this patent is extended or adjusted under 35 U.S.C. 154(b) by 359 days.

(21) Appl. No.: 15/364,671

(22) Filed: Nov. 30, 2016

(65) Prior Publication Data

US 2017/0158322 A1   Jun. 8, 2017

Related U.S. Application Data

(60) Provisional application No. 62/262,041, filed on Dec. 2, 2015.

(51) Int. Cl.
*B64C 29/00* (2006.01)
*B64C 39/10* (2006.01)
*B64C 3/32* (2006.01)

(52) U.S. Cl.
CPC ............ *B64C 29/0025* (2013.01); *B64C 3/32* (2013.01); *B64C 39/10* (2013.01); *Y02T 50/12* (2013.01)

(58) Field of Classification Search
CPC ........................ B64C 29/0025; B64C 29/0016
See application file for complete search history.

(56) References Cited

U.S. PATENT DOCUMENTS 3,110,456 A * 11/1963 Creasey .............. B64C 29/0016
                                                    244/12.3
5,320,305 A *  6/1994 Oatway ............... B64C 29/0025
                                                    244/12.3

8,016,226 B1    9/2011  Wood
8,152,096 B2    4/2012  Smith
8,496,203 B2    7/2013  Schwarze et al.
8,505,846 B1    8/2013  Sanders, II
8,733,690 B2 *  5/2014  Bevirt ................. B64C 29/0033
                                                    244/12.4
8,991,751 B2    3/2015  Page et al.
9,085,355 B2    7/2015  DeLorean
9,156,549 B2   10/2015  Vetters et al.
9,334,049 B1    5/2016  LeGrand, III et al.
9,365,290 B1    6/2016  Morris
9,387,929 B2    7/2016  Gaillimore et al.
(Continued)

FOREIGN PATENT DOCUMENTS

DE       202015007089 U1 * 11/2015  ......... B64C 29/0025

*Primary Examiner* — Brian M O'Hara
(74) *Attorney, Agent, or Firm* — McKay & Associates, P.C.

(57) ABSTRACT

A VTOL aircraft, preferably of the swept wing design. An arrangement of propellors and motors are individually housed within ducts which are mounted within a wing. Each individual motor support arm will run from the motor it is supporting, through the duct wall and into the wing and will be attached to a central frame structure housed in the fuselage. Covers are provided over the ducts, operable by motor means such as a servo. When the aircraft is relying on the internally housed propellors to provide lift, the covers will be open to allow air to pass through the ducts. When the aircraft is relying on airflow over the wings to provide lift these covers can be closed to provide uninterrupted airflow over the wings. The covers are designed to match the surface contour of the wing when closed.

12 Claims, 9 Drawing Sheets

(56) References Cited

U.S. PATENT DOCUMENTS

| | | | |
|---|---|---|---|
| D772,756 S * | 11/2016 | Gambus | .................... D12/16.1 |
| 10,040,547 B1 * | 8/2018 | Pedigo | ................ B64C 29/0016 |
| 2007/0246601 A1 | 10/2007 | Layton | |
| 2017/0158322 A1 * | 6/2017 | Ragland | .............. B64C 29/0025 |

* cited by examiner

AIRCRAFT WITH INTERNALLY HOUSED PROPELLOR UNITS

CROSS-REFERENCE TO RELATED APPLICATIONS

The instant application claims benefit of provisional application Ser. No. 62/262,041, filed Dec. 2, 2015, the contents of which are incorporated herein by reference.

BACKGROUND

Field of the Invention

The instant invention relates to tail-less, fixed wing aircraft having horizontal or vertical take-off and landing capabilities (VTOL).

Description of the Related Art

Aircraft incorporating helicopter-like, rotary lift propellers are known in the art. For instance, U.S. Pat. No. 6,886,776 to Wagner et al. shows a personal aircraft (PAC) capable of vertical take-off and landing (VTOL) comprising a fixed wing and a fuselage with a passenger compartment having a front, a rear and two sides, and a plurality of independently powered thrusters, preferably integrated into the wing, on each side of the fuselage. The thrusters, which are ducted fan units capable of providing a vertically upward force to the aircraft, are provided with such redundancy that the aircraft can hover with at least one thruster inoperative on each side of the fuselage.

U.S. Pat. No. 8,016,226 to Wood teaches a fuselage having laterally extending wing-like structures. The wing-like structures have an aperture. A can is positioned in the aperture. The can has an axle. The axle rotatably couples the can to the aperture. The can has an upper cylindrical section and a lower rectilinear section. A multi-blade rotor is rotatably mounted in the upper section. A battery of airfoils is pivotally mounted in the lower section.

U.S. Pat. No. 8,152,096 to Smith describes an aircraft which may have a fuselage having a longitudinal axis, a left wing extending from the fuselage, a right wing extending from the fuselage, a tail section extending from a rear portion of the fuselage, a first ducted fan rotatably mounted to the left wing, a second ducted fan rotatably mounted to the right wing, and an engine disposed in the fuselage which is connected to the first and second ducted fans.

Finally, U.S. Pat. No. 8,733,690 to Bevirt et al. shows: an aerial vehicle adapted for vertical takeoff and landing using the same set of engines for takeoff and landing as well as for forward flight; an aerial vehicle which is adapted to takeoff with the wings in a vertical as opposed to horizontal flight attitude which takes off in this vertical attitude and then transitions to a horizontal flight path; and, an aerial vehicle which controls the attitude of the vehicle during takeoff and landing by alternating the thrust of engines, which are separated in at least two dimensions relative to the horizontal during takeoff, and which may also control regular flight in some aspects by the use of differential thrust of the engines.

Typical is that the rotary blades allowing for vertical take-off are typically mounted at least partially external to the wings or body of the aircraft, thus they at least partially extend from the air frame. Such an arrangement contributes to loss of lift. So in an effort to minimize the aerodynamic loss, the numbers of propellors are minimized. As a result, however, there is no motor redundancy, which will lead to the loss of the aircraft should only one motor fail. In addition, typical motor arrangements have not been optimized, resulting in low fuel/energy efficiency.

There is a need then for an aircraft of the VTOL type which has the high fuel/energy efficiency of a fixed wing aircraft design, but also with the mobility of a multirotor or helicopter design.

SUMMARY

Comprehended is a VTOL aircraft, preferably of the swept wing design. An arrangement of propellors and motors are individually housed within ducts which are mounted within a wing. Each individual motor support arm will run from the motor it is supporting, through the duct wall and into the wing and will be attached to a central frame structure housed in the fuselage. Covers are provided over the ducts, operable by motor means such as a servo. When the aircraft is relying on the internally housed propellors to provide lift, the covers will be open to allow air to pass through the ducts. When the aircraft is relying on airflow over the wings to provide lift these covers can be closed to provide uninterrupted airflow over the wings. The covers are designed to match the surface contour of the wing when closed.

Accordingly, comprehended is a vertical take-off aircraft, comprising an airframe having two sides. A pair of wings, each wing extending from each of the sides, have a top surface and lower surface. A central frame structure is within each wing, the central frame structure defining at least one duct wall, wherein a height of the duct wall is equal to a distance between the top surface and the bottom surface such that at least one duct is formed within the airframe having a volume entirely within the wing. At least one support member has a proximal end and a distal end, the proximal end attached to the central frame structure, the distal end extending to the duct. A motor is disposed at the distal end of the support member. A propeller is operable by the motor, the propeller entirely within the duct; and, at least one cover is operable along the top surface to open and close over the duct, each cover matching a contour of the top surface, wherein when the cover is in an open position air is allowed to pass through the duct, and wherein when the cover is in a closed position, the integrity of the top surface of the wing is maintained to un-interrupt airflow over the wing.

In the preferred embodiment the pair of wings are swept wings, and precisely six ducts are formed within the airframe. The ducts are triangularly arranged at three of the ducts per each of the sides, thereby forming a triangular arrangement within each wing.

DETAILED DESCRIPTION OF THE PREFERRED EMBODIMENT

Referencing then FIGS. 1-10, shown is the instant aircraft 1. As to the body of the aircraft 1, or airframe 2, in the preferred embodiment a tail-less "flying wing" design is shown. Removing the tail offsets weight, and has the added benefit of reducing the overall size of the plane. The aircraft 1 may or may not include a fuselage, although a fuselage is shown, hence airframe 2 means the body of the aircraft 1 with or without a fuselage. The airframe 2 that is selected needs to consider the needs of the vertical thrust propellors 16 for efficient operation. The airframe 2 simply requires two sides 4, and a swept wing 5 design is preferred. By using a swept wing design, the center of gravity (CG) that is needed for the wings 5 to operate efficiently can be moved back to match the center of gravity needed by the vertical thrust propellors 16. This will allow the ducts 9 to fit within the shape of the wing 5 and have the center of gravity located appropriately, as further described.

Accordingly, a pair of wings 5 extend from each side 4 of the airframe 2. "A" as used in the claims means one or more. Each wing 5 has a top surface 6 and a lower surface 7. A central frame structure 8 resides within each wing 5, i.e. internally throughout the airframe 2. The central frame structure 8 can comprise any arrangement of slats as would be required to provide for a connection means, as follows. Critically, the central frame structure 8 forms at least one duct wall 10, which in turn defines at least one duct 9. The height of the formed duct wall 10 is equal to a distance between the top surface 6 and the lower surface of the wing 5. Accordingly, the duct 9 is formed having a volume entirely within the wing 5. In the preferred embodiment, to aid in aerodynamics, the duct wall 10 curves to form a rounded lip 11 as it transitions to each lower surface 7 and top surface 6. Rounding the lip 11 around the ducts 9 where the airflow enters will help to enhance stability as well as increase overall efficiency of the design. This will require less effort from the motors 15 to maintain stability and will therefore increase motor 15 efficiency.

At least one support member 12 connects a motor 15 to the central frame structure 8. Support member 12 has a proximal end 13 and a distal end 14. The proximal end 13 is attached to the central frame structure 8, with the distal end 14 extending to the duct 9. As it relates to the support member 12, the member 12 is a motor supporting arm, and preferred is a strip of rigid or semi-rigid material such as plastic, about the width of the motor 15 and as thin as possible while still retaining the necessary strength/flexural properties. Each individual motor support member 12 will run from the motor 15 it is supporting, through the duct wall 10 and into the wing 5, and will be attached to the central frame structure 8 as shown. Accordingly, each motor 15 is disposed at the distal end 14 of the support member 12. The motor power regulation and control systems will come from a standard, centralized flight controller system. This flight controller will monitor the craft's orientation and adjust power to the motors 15 as needed to correct the orientation during vertical flight as is known in the art.

A propeller 16 is operable by each motor 15, thus the propellors 16 and motors 15 are individually housed within the ducts 9 which are mounted within the wing 5. The arrangement is such that the propellors 16 will work together to create vertical thrust and give a fixed wing aircraft vertical takeoff and landing capabilities, as well as the ability to hover in place and move about in any direction without the need to maintain airflow over the wing 5. The propellors 16 are attached to motor 15 using any type of retaining nut 21 as shown. The purpose of this design is to allow for a single aircraft to have the high fuel/energy efficiency of a fixed wing aircraft design, as well as the mobility of a multirotor or helicopter design. The arrangement of each propeller being "entirely" within the duct 9 means all components of the propeller 16 is within the wing, and this arrangement provides several benefits over existing designs. By housing the propellors 16 within the wing 5 there is minimal drag added to the wing design. At the same time, by keeping the propellors 16 within the wing 5, the design allows for no loss of lift due to obstruction of airflow over the wings 5. Keeping the propellors 16 within a ducted environment and mounted within a wing 5 provides a certain level of natural stability in orientation.

The number and arrangement of motors 15 with propellers 16 is critical at six (6), with three (3) per each side 4, i.e. six (6) ducts 9, triangularly arranged within each wing 5 to form a triangular arrangement 18 (FIG. 1), with two (2) ducts 9 inboard, or disposed nearest to the airframe 2 (fuselage or main body) with an outer, singular duct 9 completing the triangular arrangement 18. Four motors (2 per side) would produce less lift or require larger propellors and a larger airframe. The triangular shape of each wing (necessary for stable tailless design) side allows "free" space to add a third duct 9 next to the two inboard ducts 9. A fourth duct per side would mean making the wing more squared to fit the square arrangement, which would not work for a tailless design, but maybe for a traditional tailed design. Or the ducts could be made smaller which means less efficiency. Either way motor weight is added gains are offset, through added tail weight or reduced size and per motor thrust and efficiency. The triangular arrangement 18 of three per side also lines up well with the center of gravity (CG) of the airframe 2. Additionally, the swept wings 5 have several purposes, one of which is to pull the CG aft to match the center line of the ducts 9.

At least one cover 17 is operable along the top surface 6 and/or lower surface 7 to open and close over the duct 9. Critical is that each cover 17 matches the contour of the top surface 6 of the wing 5. Each cover 17 is hingedly attached to the wing 5 and can be actuated by servos or other motors controlled separately or by the flight controller system. The hinges (not shown) can be disposed such that the covers 17 open in either a front and back direction or left and right direction, and the exact location of the hinge may vary. Compare FIG. 3 to FIG. 3A for instance. The forward/rearward facing covers 17 have the benefit of acting as an air brake when opened that will slow the forward flight of the aircraft 1 as it transitions to hover, if that quality is desired. The side-facing covers 17 have the benefit of obstructing a minimal amount of airflow over the wing 5. When cover 17 is in an open position, air is allowed to pass through the duct 9. When the cover 17 is in a closed position, the integrity of the top surface 6 of the wing 5 is maintained to un-interrupt airflow over the wing 5. This design allows for the wing shape to be used both for housing the ducted propellor units, as well as provide lift while in forward motion, eliminating the need to have an area of the wing 5 that will not contribute to lift. This allows for maximum efficiency of the wing.

Figure 1:
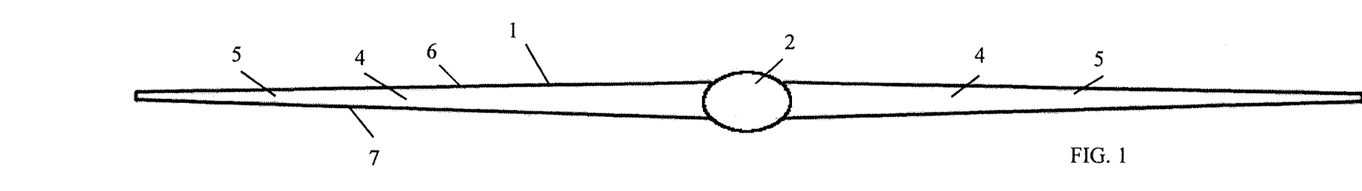
FIG. 1 shows a front view in elevation with the ducts having covers in a closed position.
Figure 2:
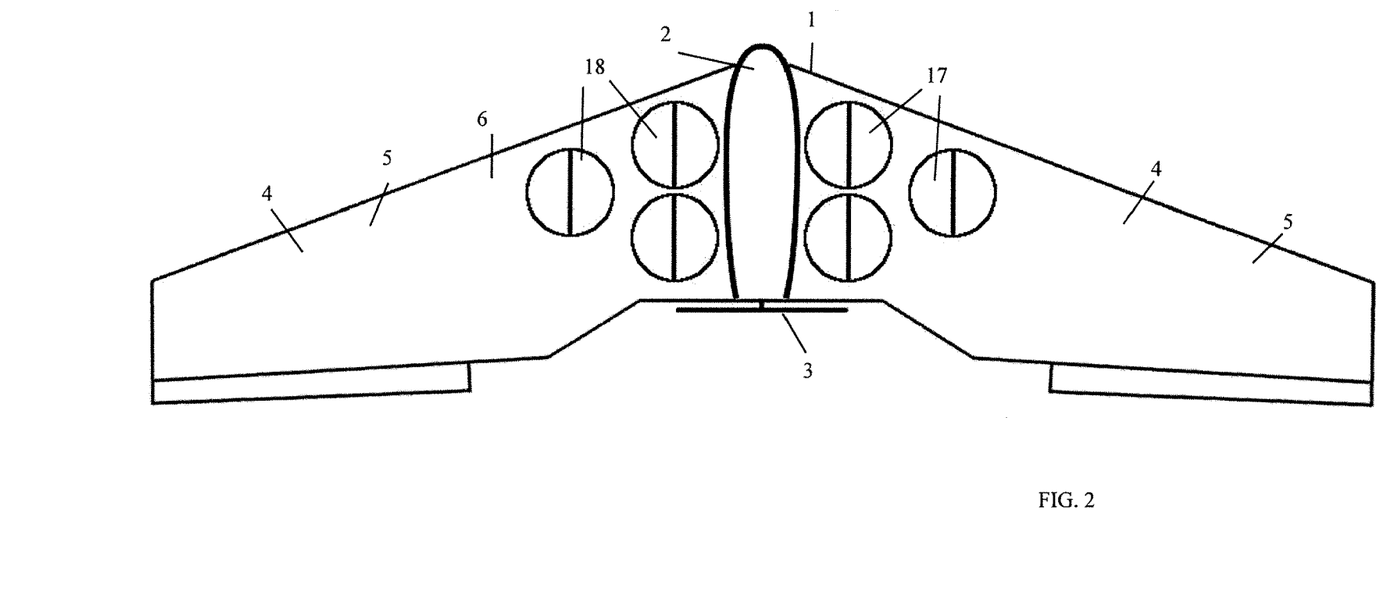
FIG. 2 shows a top view in elevation with the ducts having covers in a closed position.
Figure 3:
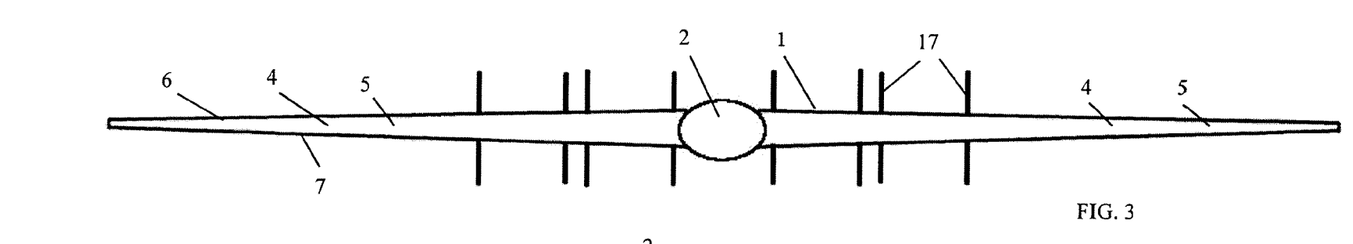
FIG. 3 shows a front view in elevation with the ducts having covers in an open position.
Figure 3A:
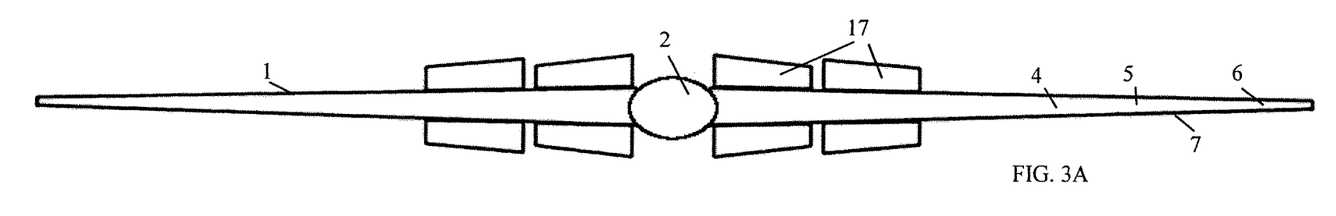
FIG. 3A shows a front view in elevation with the ducts having covers arranged in an alternative embodiment and in an open position.
Figure 4:
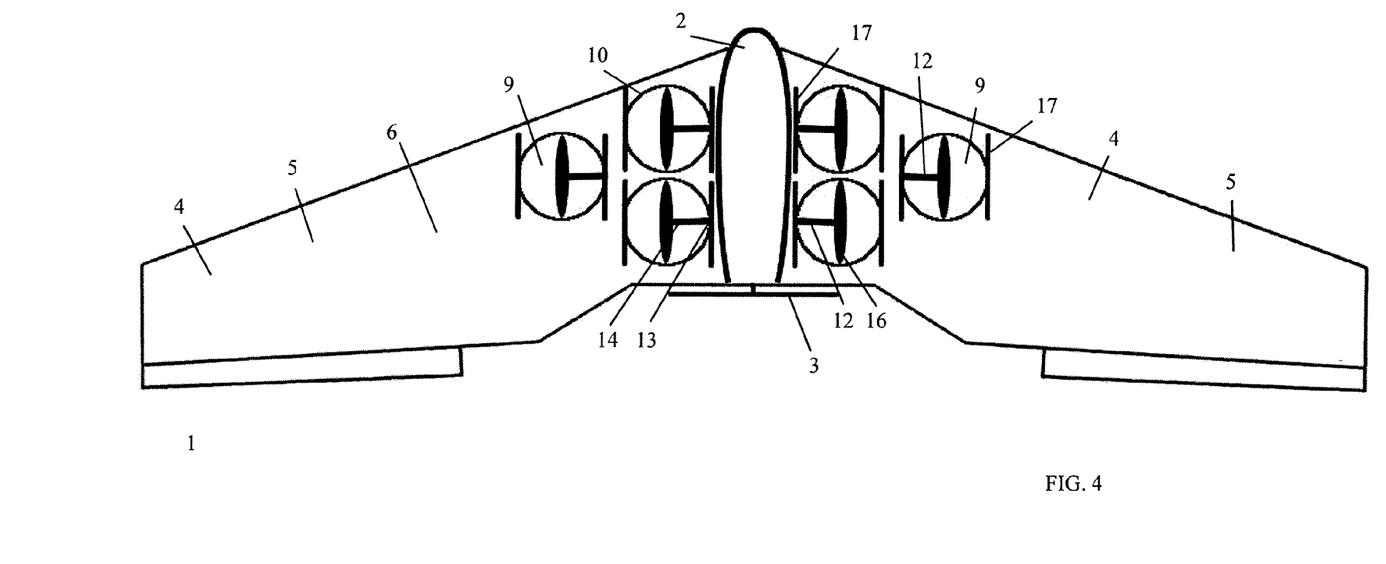
FIG. 4 shows a top view in elevation with the ducts having covers in an open position.
Figure 5:
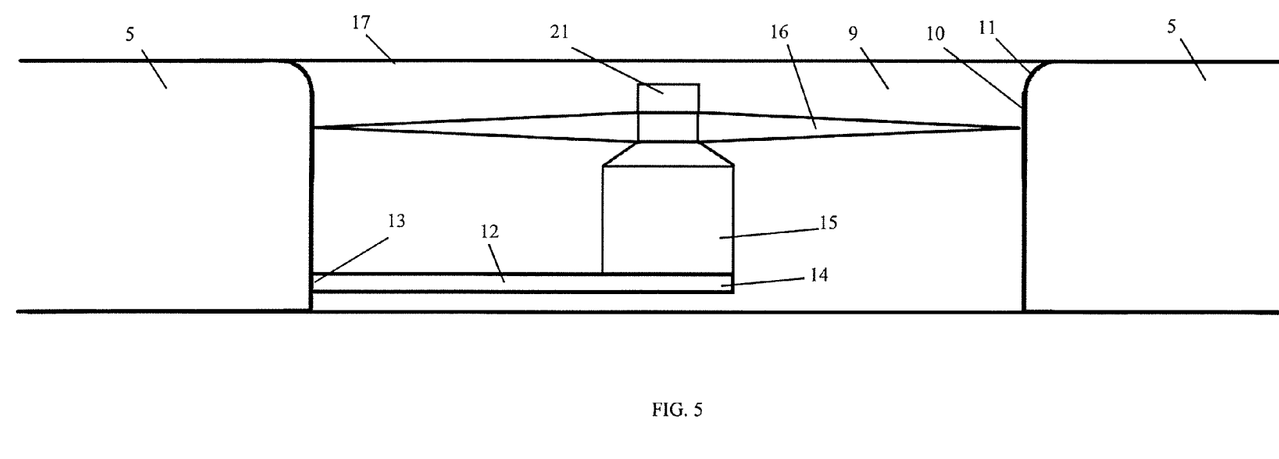
FIG. 5 shows a sectional view through the vertical plane with the duct in a closed position.
Figure 6:
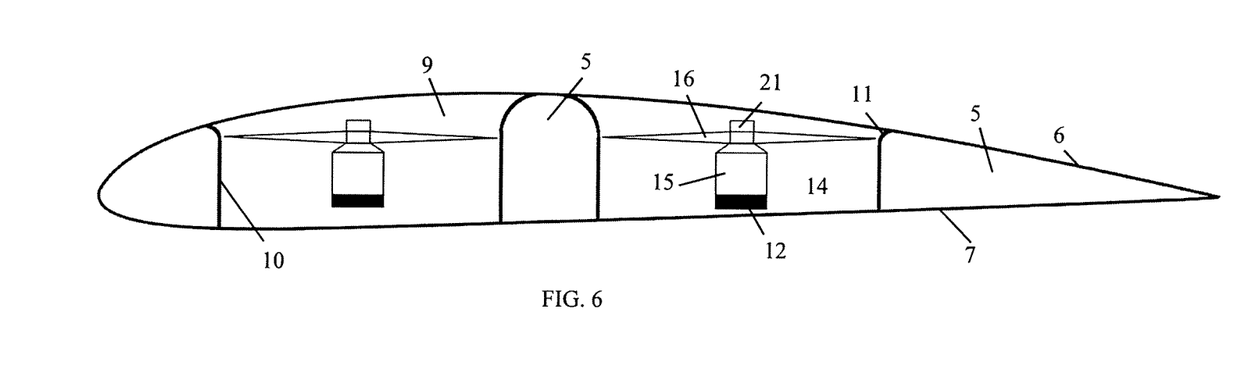
FIG. 6 shows a side cross-sectional view, i.e. the airfoil cutaway.
Figure 7:
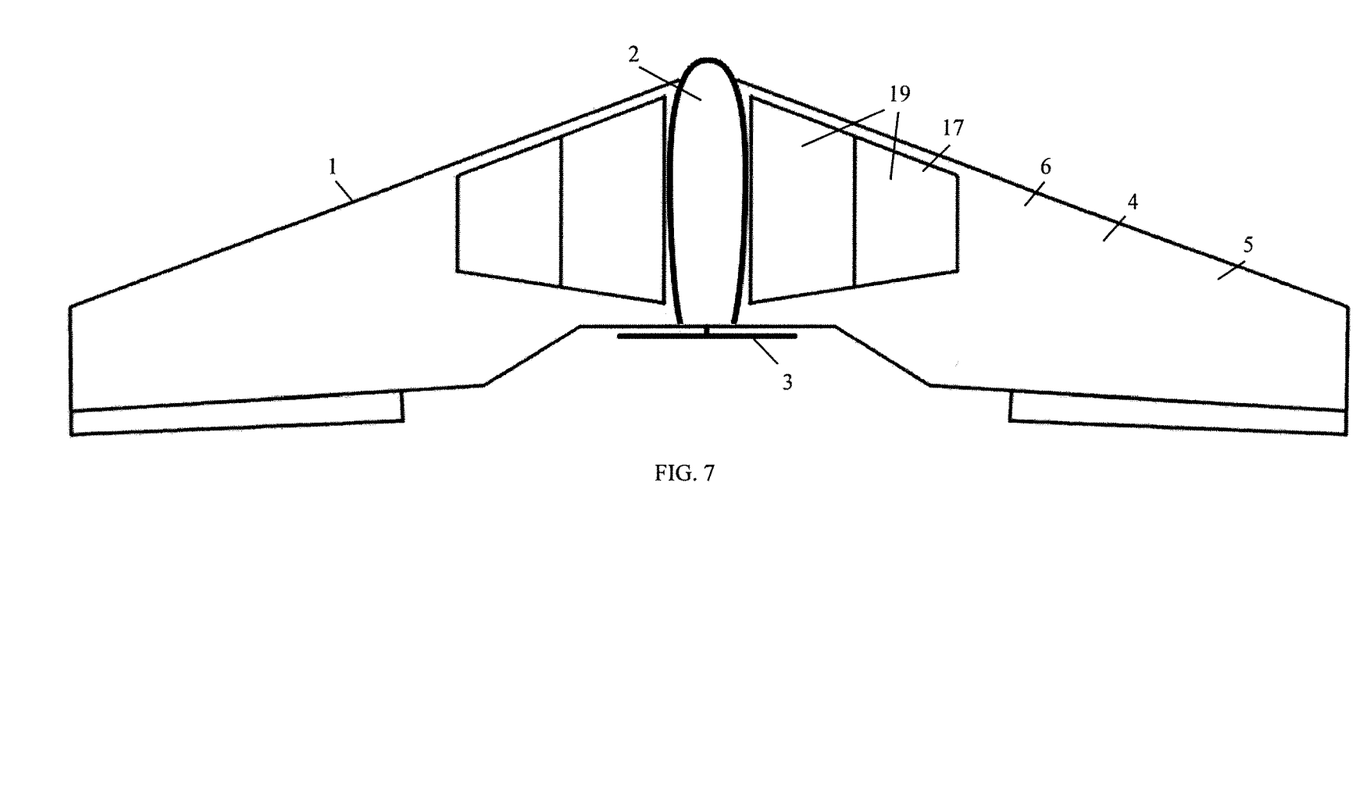
FIGS. 7-10 show elevation views of alternative embodiments of the covers.
Figure 8:
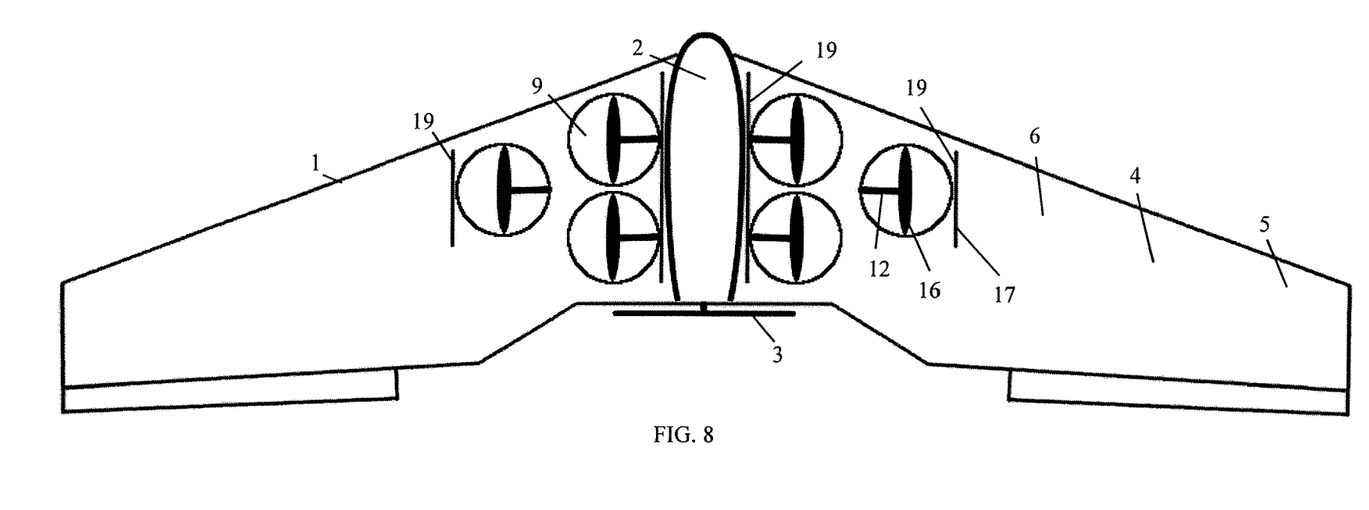

Additional variants are possible for the cover 17 hinging configuration. In FIGS. 3-4 each duct 9 is independently covered by a single cover 17. FIG. 7 shows a shared lid 19, wherein a single, split, larger cover 17 seals over the entire triangular arrangement 18. A shared lid 19 has the benefit of requiring fewer components needed to operate the covers 17, while individual covers 17 have the benefit of less aerodynamic drag on the wing 5, as well as less strength required for the opening mechanism.

Figure 9:
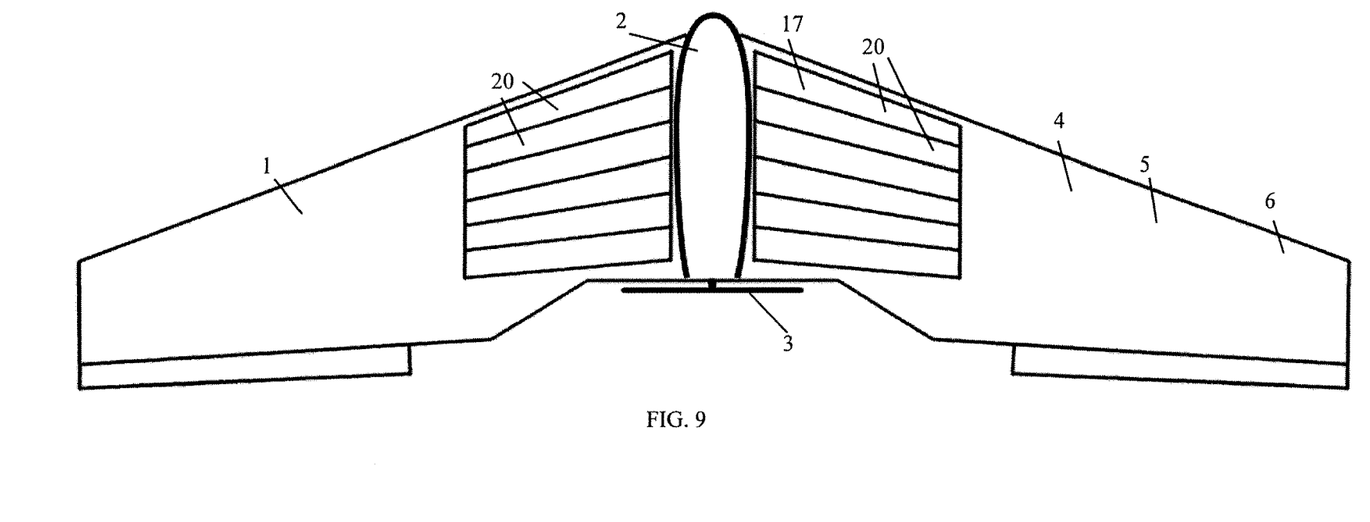
Figure 10:
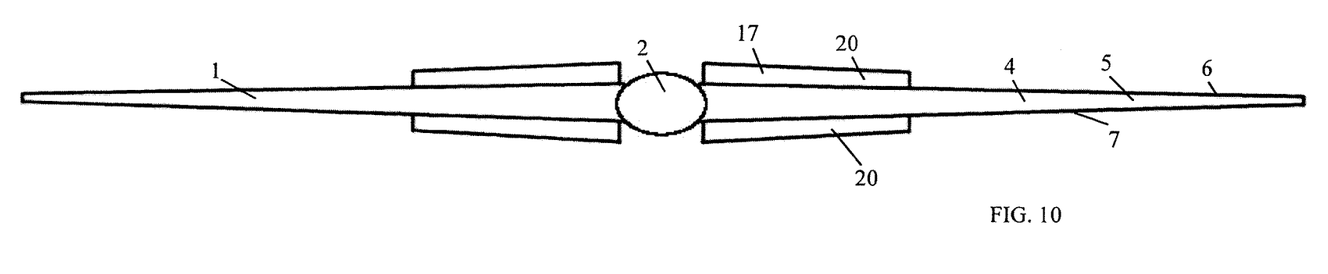

FIGS. 9 and 10 show a shared louver system 20 as an alternative embodiment. Here, the covers 17 are in a fan-like arrangement, proportionally following the wing 5 itself. This eliminates the need for compound curves which could make the use of linear hinges more difficult to employ. The shared louver system 20 mimics the wing 5 plan, just set inside the leading and trailing edges.

In use therefore, and in summary as it relates to all embodiments, by not having to add external components that extend from the airframe 2 and keeping the design internal to the airframe 2 allows for a compact and lightweight structure. Keeping a low airframe weight will again increase the efficiency of the design. The instant design also has several benefits to the safety of operators, bystanders, as well as the aircraft 1 itself. Firstly, there is the enormous benefit of protecting persons and property from exposure to the vertical thrust propellors 16 by housing them within the ducts 9. Also, by using enough ducted propeller units in a proper arrangement and with enough lift generated by the units, there is a redundancy in case of motor failure to safeguard against complete loss of lift. Lastly, by keeping the vertical thrust system separate from the forward flight system, each system can be optimized for maximum efficiency in its specific role.

I claim:

1. A vertical take-off aircraft, comprising:
an airframe having two sides;
a pair of wings, each said wing extending from one of said sides, each said wing having a top surface and lower surface,
a central frame structure within each said wing, said central frame structure defining at least one duct wall, wherein a height of said duct wall is equal to a distance between said top surface and said bottom surface such that at least one duct is formed within said central frame having a volume entirely within one of said wings;
at least one support member having a proximal end and a distal end, said proximal end attached to said central frame structure, said distal end extending into said duct;
a motor disposed at said distal end of said support member;
a propeller operable by said motor, said propeller entirely within said duct; and,
at least one cover operable along said top surface to open and close over said duct, each said cover matching a contour of said top surface, wherein when said cover is in an open position air is allowed to pass through said duct, and wherein when said cover is in a closed position, the integrity of said top surface of said wing is maintained;
wherein said at least one duct further comprises three ducts within each wing forming a respective triangular arrangement; and
wherein each triangular arrangement is covered by a shared lid.

2. The aircraft of claim 1, wherein said pair of wings are swept wings.

3. The aircraft of claim 1, wherein each said duct wall includes a rounded lip.

4. A vertical take-off aircraft, comprising:
an airframe having two sides;
a pair of wings, each said wing extending from one of said sides, each said wing having a top surface and lower surface,
a central frame structure within each said wing, said central frame structure defining at least one duct wall, wherein a height of said duct wall is equal to a distance between said top surface and said bottom surface such that at least one duct is formed within said central frame having a volume entirely within one of said wings;
at least one support member having a proximal end and a distal end, said proximal end attached to said central frame structure, said distal end extending into said duct;
a motor disposed at said distal end of said support member;
a propeller operable by said motor, said propeller entirely within said duct; and,
at least one cover operable along said top surface to open and close over said duct, each said cover matching a contour of said top surface, wherein when said cover is in an open position air is allowed to pass through said duct, and wherein when said cover is in a closed position, the integrity of said top surface of said wing is maintained;
wherein said at least one duct further comprises three ducts within each wing forming a respective triangular arrangement; and
wherein each triangular arrangement is covered by a shared louver system, wherein said shared louver system is a fan-like arrangement to mimic a plan of said wing.

5. A tail-less, vertical take-off aircraft, comprising:
an airframe having two sides;
a pair of swept wings, each said wing extending along one of said sides, each said wing having a top surface and lower surface,
six ducts defined within said airframe, wherein a height of each of said ducts is equal to a distance between said top surface and said bottom surface;
a motor and propeller disposed within each of said ducts; and,
wherein three of said ducts are triangularly arranged within one of said wings with two of said ducts inboard, and the other three of said ducts are triangularly arranged within the other of said wings with two of said ducts inboard, such that a weight and lift of said aircraft is optimized; and
wherein said triangular arrangement is covered by a shared lid.

6. The aircraft of claim 5, further comprising a central frame structure within each said wing, said central frame structure defining at least one duct wall of each of said ducts.

7. The aircraft of claim 6, further comprising at least one support member having a proximal end and a distal end, said proximal end attached to said central frame structure, said distal end extending into each of said ducts.

8. The aircraft of claim 6, wherein each said motor is disposed at said distal end of said support member.

9. The aircraft of claim 6, further comprising said propeller entirely within said duct.

10. The aircraft of claim 5, wherein said shared lid matches a contour of said top surface, wherein when said shared lid is in an open position air is allowed to pass through said duct, and wherein when said shared lid is in a closed position, the integrity of said top surface of said swept wing is maintained.

11. A tail-less, vertical take-off aircraft, comprising:
an airframe having two sides;
a pair of swept wings, each said wing extending along one of said sides, each said wing having a top surface and lower surface,
six ducts defined within said airframe, wherein a height of each of said ducts is equal to a distance between said top surface and said bottom surface;
a motor and propeller disposed within each of said ducts; and,
wherein three of said ducts are triangularly arranged within one of said wings with two of said ducts inboard, and the other three of said ducts are triangularly arranged within the other of said wings with two of said ducts inboard, such that a weight and lift of said aircraft is optimized; and
wherein said triangular arrangement is covered by a shared louver system, wherein said shared louver system is a fan-like arrangement to mimic a plan of said wing.

12. The aircraft of claim 11, wherein each said shared louver system matches a contour of said top surface, wherein when said shared louver system is in an open position air is allowed to pass through said duct, and wherein when said shared louver system is in a closed position, the integrity of said top surface of said swept wing is maintained.

* * * * *